Oct. 19, 1948.
A. BLANCHARD
2,451,797
APPARATUS FOR PRODUCING PRESSURE PULSES IN BORE HOLES
Filed Feb. 17, 1945
4 Sheets-Sheet 1
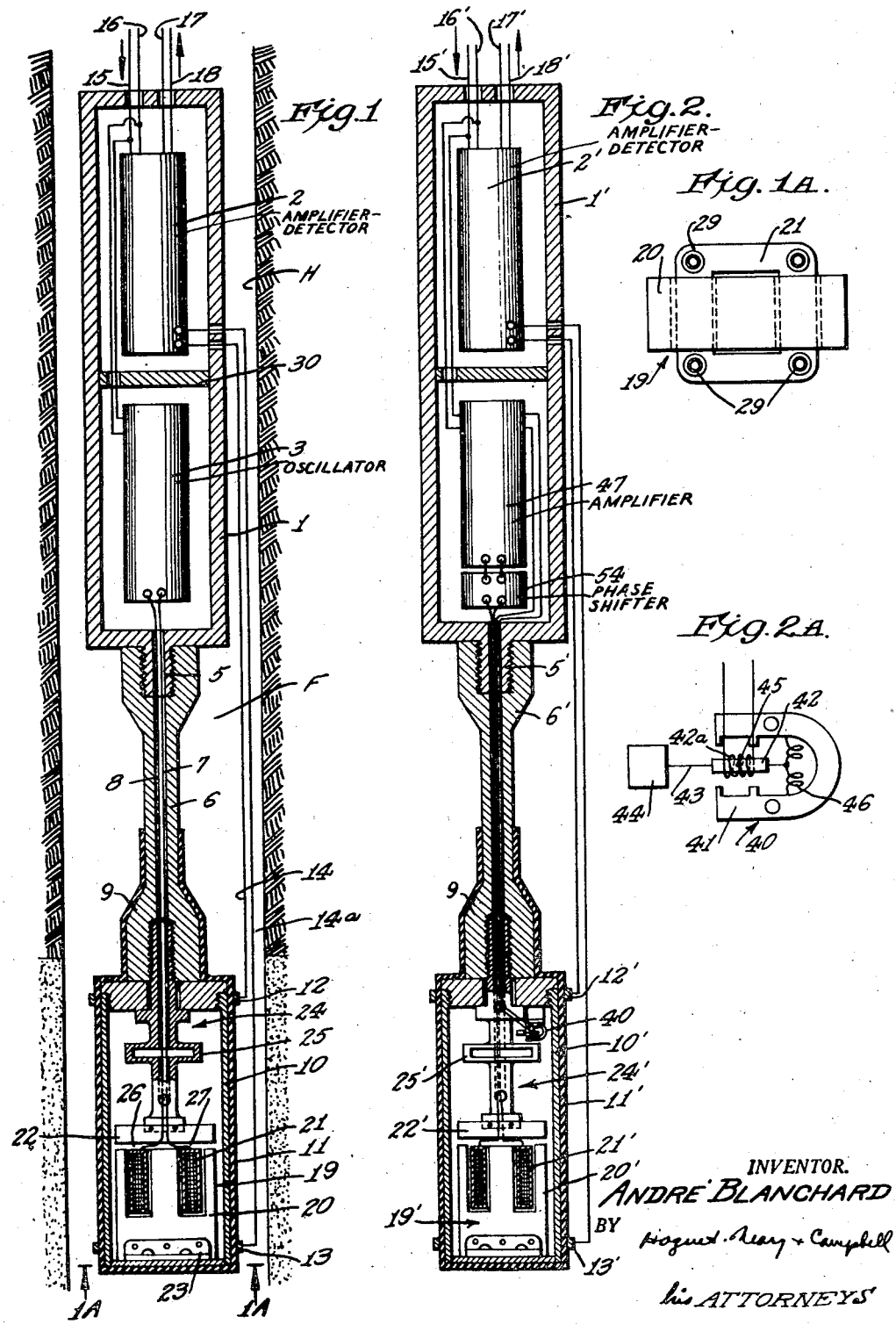
INVENTOR.
ANDRÉ BLANCHARD
BY
his ATTORNEYS Oct. 19, 1948.　　　A. BLANCHARD　　　2,451,797
APPARATUS FOR PRODUCING PRESSURE
PULSES IN BORE HOLES.
Filed Feb. 17, 1945　　　4 Sheets-Sheet 2
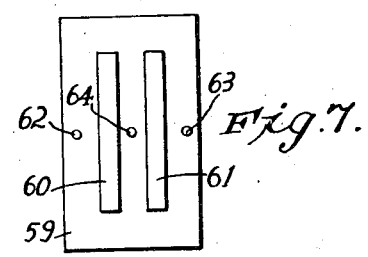
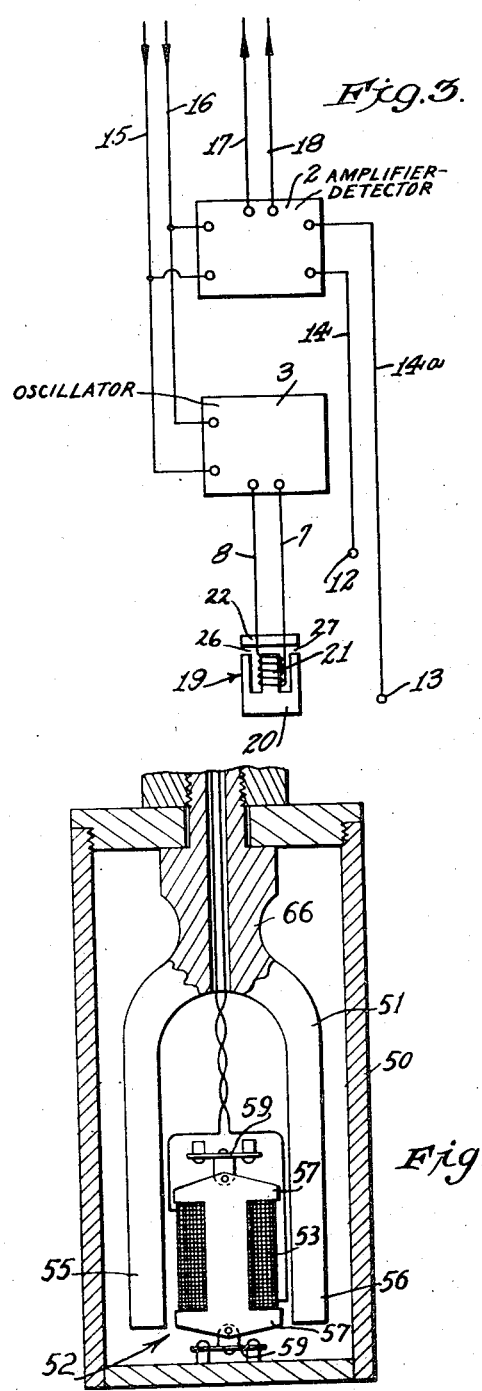
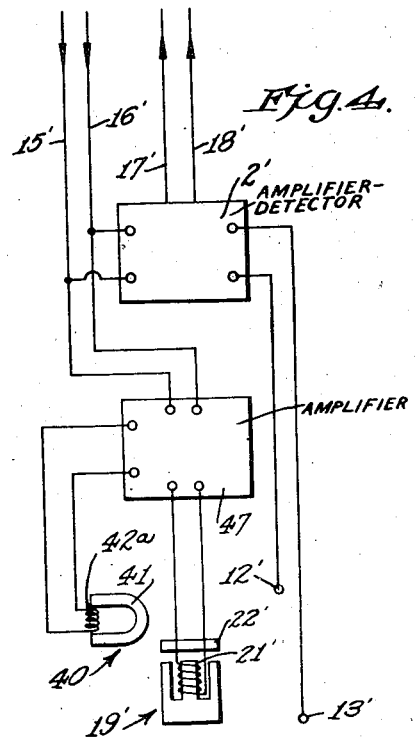
INVENTOR.
ANDRÉ BLANCHARD
BY
his ATTORNEYS Oct. 19, 1948.  A. BLANCHARD  2,451,797
APPARATUS FOR PRODUCING PRESSURE
PULSES IN BORE HOLES.
Filed Feb. 17, 1945  4 Sheets-Sheet 3

INVENTOR.
ANDRÉ BLANCHARD
BY Hoguet, Leary & Campbell
his ATTORNEYS

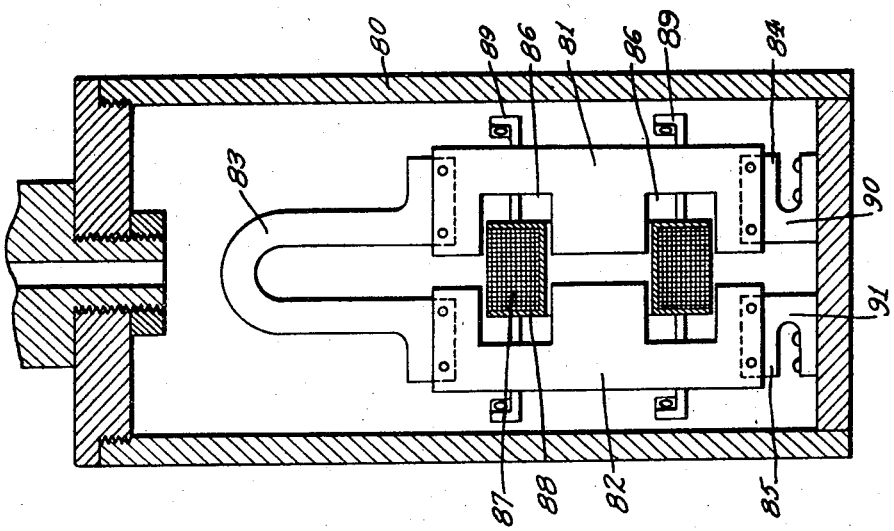

Patented Oct. 19, 1948

2,451,797

UNITED STATES PATENT OFFICE 2,451,797

APPARATUS FOR PRODUCING PRESSURE PULSES IN BOREHOLES

André Blanchard, Houston, Tex., assignor to Schlumberger Well Surveying Corporation, Houston, Tex., a corporation of Delaware Application February 17, 1945, Serial No. 578,529

12 Claims. (Cl. 177—386)

1

This invention relates to devices for producing vibrations and pressure pulses, and it relates particularly to devices for emitting vibrations and pressure pulses while subjected to high static pressures such as are encountered in fluid-filled bore holes.

As disclosed in the Doll application, Serial No. 446,888, filed June 13, 1942, now Patent No. 2,433,746, dated December 30, 1947, it has been discovered that permeable strata in the earth which are traversed by a bore hole can be located and classified by detecting alternating streaming potentials produced in such strata. The alternating streaming potentials can be produced by generating pressure pulses in the bore hole liquid by means of pressure pulse emitting devices similar to those used in submarine signalling.

The prior submarine signalling devices are useful at shallow depths wherein the static pressure of the liquid does not exceed a few hundred pounds per square inch. However, these devices are not satisfactory for use at greater depths wherein the static liquid pressure may be several thousand pounds per square inch.

Such prior devices are usually provided with a diaphragm in contact with the liquid or are made expansible and contractible in order to generate the pressure pulses. In order to withstand the very high pressure encountered in the bore hole, it is necessary to make the diaphragm and the casing of the device very thick and rigid, and for that reason it is necessary to provide a very powerful mechanism for vibrating the diaphragm. Inasmuch as the bore hole, at great depths, for example 8,000 to 10,000 feet, usually has a diameter of only about seven or eight inches, it is difficult to provide a vibrating mechanism of sufficient power to generate substantial pressure pulses. Moreover, the stiffness of the diaphragm tends to increase its natural resonant frequency and inasmuch as the generator must be operated at its natural frequency in order to be reasonably efficient, such generators are operable only at very high frequencies.

An object of the present invention is to provide an apparatus which is capable of producing powerful pressure pulses even when subjected to very high static pressures.

Another object of the invention is to provide an apparatus capable of producing powerful pressure pulses and which at the same time is sufficiently compact to permit it to be lowered into a bore hole.

Another object of the invention is to provide

2 a signal generator which does not include a diaphragm and which does not appreciably change its volume while in use.

A further object of the invention is to provide electro-mechanical oscillating systems which are adapted to operate at a predetermined frequency or at a self-maintained natural resonant frequency.

Other objects of the invention will become apparent from the following description of typical forms of signal generators embodying the present invention.

In accordance with the present invention a signal generator has been provided including an element, hereinafter referred to as a bell, which is vibrated bodily, without change of volume, under such conditions as to produce powerful pressure pulses in the bore hole fluid.

More particularly, devices of the type embodying the present invention may include a relatively massive body containing electrical equipment necessary for supplying energy to a vibrating mechanism in the bell. The bell is connected thereto by a resilient coupling so that upon operation of a vibrating mechanism in the bell, it is caused to vibrate bodily relatively to the more massive casing.

In one form of the invention, the bell may be vibrated at its natural resonant frequency by means of an oscillator tuned to this frequency so that under all conditions of operation, the frequency of the vibrating system remains the same.

In another form of the invention, a bell may be vibrated at its natural resonant frequency and at a self-maintained frequency whereby the frequency of vibration of the bell may vary in accordance with the density of the liquid in the bore hole and other factors.

Inasmuch as the bell is not expansible or contractible, it can be provided with strong rigid walls which permit it to be used at substantially any depth regardless of the pressure exerted on it by the fluid.

Devices of this character are particularly suitable for generating alternating streaming potentials in porous strata at all depths in the bore hole, inasmuch as the device is operative regardless of the depth at which it is used. This is a great advantage inasmuch as the measurements of the potentials are usually made while moving the transmitter or emitter along the bore hole.

For a better understanding of the present invention, reference may be had to the accompanying drawing in which:

Figure 1 is a view in vertical section of a typical form of signal generator operable at a fixed frequency, embodying the present invention;

Figure 1A is a view taken on line 1A—1A of Figure 1 looking in the direction of the arrows;

Figure 2 is a view in vertical section of a modified generator which operates at its resonant frequency;

Figure 2A is a detail of the pickup device of Figure 2;

Figure 3 is a typical wiring diagram which may be employed with the apparatus of Figure 1;

Figure 4 is a typical wiring diagram which may be employed with the apparatus of Figure 2;

Figure 5 is a view in vertical section through a modified type of generator which incorporates a tuning fork;

Figure 7 is a plan view of a coil mounting member which is rigid in two directions but very flexible in the third direction;

Figure 8 is a vertical section through a modified form of signal generator; and

Figure 9 is a vertical section through another type of signal generator.

Figure 6:
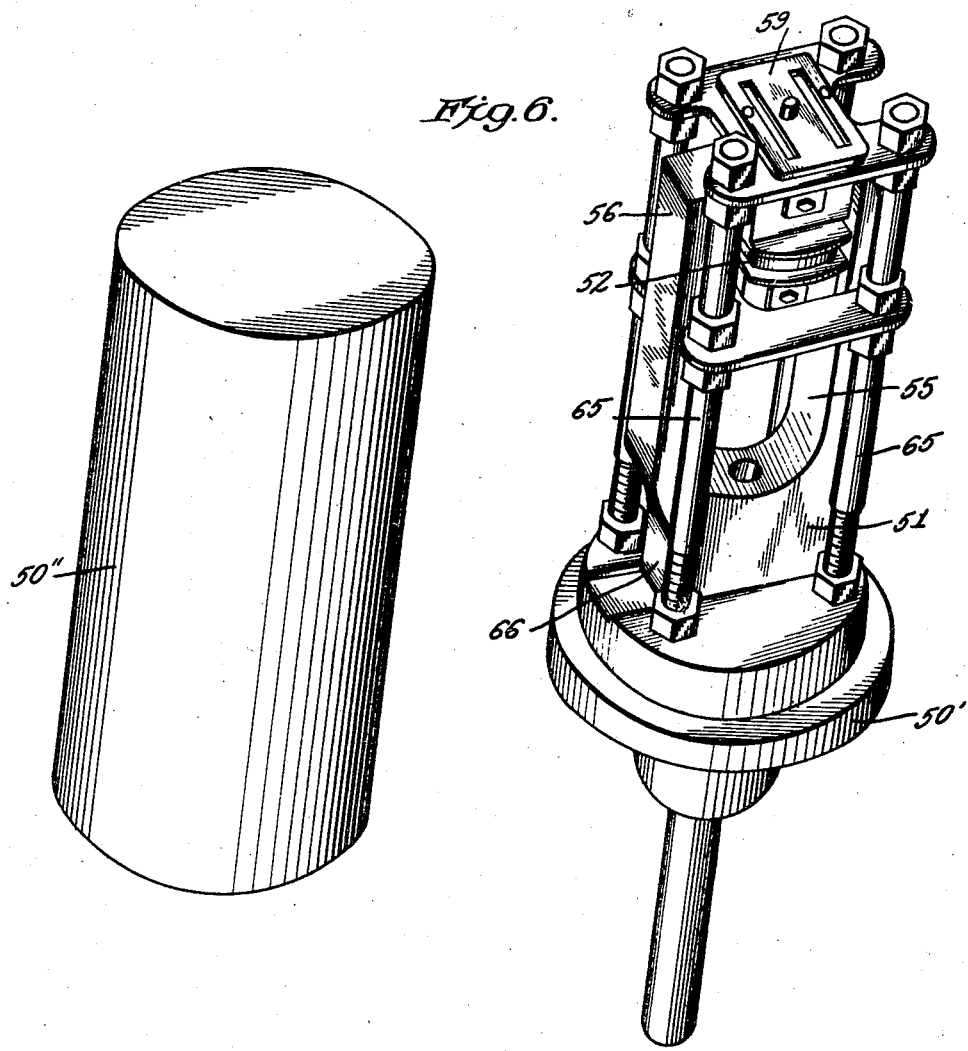
Figure 6 is a perspective view of the tuning fork and bell assembly of Figure 5.

A feature of this invention resides in the provision of a signal generator, which generator is vibrated bodily at the desired frequency. The driving device may be of any desired type. It is preferably an electrically energized mechanical arrangement having a pair or more of masses connected by an elastic member. Typical examples of this class of generators will be described in detail to disclose the novel principles of the invention.

Referring to Figure 1, the apparatus is shown positioned in a high pressure media such as the fluid F contained in a deep bore hole H. An upper, water-tight, pressure resistant casing 1 of relatively large mass houses an electronic amplifier and detector 2 and an electronic oscillator 3 of conventional design. The lower end of casing 1 has a protruding hollow threaded pin 5 onto which is screwed the top end of a metal tube 6 which is sufficiently elastic to stretch and contract under axially directed stresses. Pin 5 and tube 6 receive two insulated wires 7 and 8. The lower end 9 of tube 6 is enlarged and threaded internally to permit it to be connected rigidly to a pressure-resistant, water-tight casing or bell 10. The bell 10 is a hollow, liquid-tight casing, preferably, although not necessarily, cylindrical in shape.

It is desirable sometimes to have more than one elastic member 6 between the bell 10 and upper housing 1, in which case, the tube 6 may be replaced by equivalent means such as three equally spaced rods.

The length of the bell 10 preferably should be several times its diameter, the best length being half a wave length in the bore hole fluid.

The bell 10 contains a mechanical oscillator system, hereinafter described.

The entire outer surface of the bell 10 and part or all of the tube 6 are covered with an insulating material 11. Two electrodes 12 and 13 are positioned near the top and bottom ends of the bell 10 respectively, and the dimensions of the entire apparatus are chosen so that the electrodes 12 and 13 will be in close proximity to the walls of the bore hole H. Electrodes 12 and 13 are connected by shielded insulated wires 14 and 14a respectively to the input of the amplifier and detector 2.

The apparatus is lowered into the bore hole on an electric cable containing insulated electrical conductors 15, 16, 17, and 18.

The mechanical oscillating system includes an electromagnet 19 having a laminated magnetic core 20 within which is formed a winding 21, the terminals of the winding 21 being connected by means of the conductors 7 and 8 to the output of oscillator 3. A high permeability laminated armature 22 is so arranged that it completes the magnetic circuit of the electromagnet 19 in a conventional manner. The magnetic core 20 is rigidly fastened to the base of bell 10 by a clamping plate 23.

The armature 22 is rigidly attached to a member 24, the upper end of which is rigidly attached to the top end of the bell 10 and the tube 6. The member 24 is resilient so that its overall length changes as the armature 22 is attracted to the magnetic core. In order to make the member 24 more resilient, a frame-like member 25 is formed intermediate its two ends. The member 25 is essentially a spring, the stiffness of which is altered by increasing or decreasing its dimensions. The length of elastic member 24 is such that a small air gap normally exists between the armature 22 and the core 20.

In operation the apparatus is lowered into the bore hole and the electrical energy for producing the vibrations is supplied from the surface through the conductors 15 and 16 in the supporting cable, as better shown in Figure 3, or from a battery (not shown) in the casing 1. The electrical energy may be either alternating or direct current as desired, but it will be assumed that 60 cycle alternating current is supplied. The 60 cycle energy sent from the surface supplies the filament current, plate voltage, etc. for both the amplifier and detector 2 and the oscillator 3 in the conventional manner. The oscillator 3 is adjusted to a frequency which corresponds to the natural frequency of the mechanical oscillating system 22, 24 and the bell 10 as will be more fully explained later. The output of oscillator 3 is transmitted through wires 7 and 8 to the electromagnet 19, thereby energizing the electromagnet at its natural frequency. When current flows through the winding 21 of the electromagnet, the flux produced passes out of the core 20 through the air gaps 26 and 27, the magnetic circuit being completed by the armature 22. The output of oscillator 3 is biased by a constant voltage so that its output takes the form of a modulated wave, that is, the current always flows in the same direction through the winding 21, but the magnitude varies at the oscillator frequency. Thus the action of the magnetic field produced by electromagnet 19 is to pull the armature 22 toward the core 20 once each cycle.

Alternately, the oscillator frequency may be half the natural frequency of the mechanical oscillating system and the electromagnet is energized by the unbiased output of the oscillator. The electromagnet then pulls downwardly on armature 22 twice each cycle, driving the mechanical oscillating system at its natural frequency. The frequency of vibration may be of any desired value, for example, 600 cycles per second.

The upper case 1, having a relatively very large mass, does not follow appreciably the vertical or axial vibrations of the bell 10. The tube 6, therefore, is alternately compressed and elongated at the vibration frequency so that the bell 10 has a vertical motion of small amplitude.

This movement develops an inertia force which is compensated for by the elastic force of the tube, thus making the whole system mechanically resonant.

If at one instant of time the bell 10 is moving downwardly, the pressure below the bell is increased and the pressure above the bell is decreased. An alternating differential pressure, therefore, exists in the bore hole fluid above and below the bell 10. The bore hole pressure at a point opposite electrode 12, therefore, alternately increases and decreases. The same pressure pulses, but of opposite phase, appear in the bore hole adjacent the electrode 13. These pressure pulses produce alternating streaming potentials in the adjacent permeable formations, which potentials are picked up by the electrodes 12 and 13 in a manner and for purposes more fully explained in co-pending Doll application, Serial No. 446,888. The potential differences appearing between electrodes 12 and 13 are conducted through the well shielded wires 14 and 14a to the input of the amplifier and detector 2. These small voltages are amplified and then rectified by unit 2 and the D. C. output or any signal controlled by it is transmitted through the two conductors 17 and 18 in the supporting cable to the surface of the earth where they are recorded by suitable recording means.

In a mechanical resonant oscillator like the device described above, the amplitudes are limited by the friction and losses in the mechanical system. For efficient operation of a mechanical oscillator, it is desirable that no rubbing or undue friction loss be present and, consequently, that every part of the vibrating system be very rigidly held together. For these reasons, it is necessary to take great precautions to make sure that the entire vibrating system is very rigid so that it may function as one mass.

One difficulty encountered in the construction of this type of apparatus is in providing a coil winding which will function as a solid mass. This difficulty can be overcome by supporting the coil in such a manner that it need not follow the vertical vibrations of the bell 10. Figure 1A discloses one means for supporting the winding of electromagnet 19 to permit relative movement of the bell 10 and the winding.

Referring to Figure 1A, the winding 21 extends beyond the core 20 on two sides. Soft compression springs 29 are mounted between the winding 21 and the base of the bell 10. The stiffness of the springs 29 and the mass of the winding 21 are so arranged that the natural resonant frequency is very low, for example, on the order of 20 to 30 cycles per second so that for all practical purposes the winding 21 remains stationary while the core 20 and bell 10 vibrate vertically. Also with this construction, the mass, center of gravity, etc., of the winding need not be considered when computing or determining the resonant frequency of the mechanical oscillating system.

When two electrical circuits are to be coupled, the degree of coupling between the two circuits must not be too large or to small, if a single resonant frequency of maximum amplitude is to appear in the output. When the two coupled circuits are loosely coupled, part of the amplitude is lost. When the two electrical circuits are overcoupled, the well known double humped frequency characteristic appears; that is, the combined circuit actually has two resonant frequencies. An identical situation exists in the mechanical oscillators illustrated in the drawings.

The vibrating portion of the apparatus shown in Figure 1, that is, the bell 10, its support, and its contents, actually is comprised of two mechanical oscillators, each of which may have its own resonant frequency. One of the mechanical oscillators is the armature 22 and support 24. The other is the bell 10 and tube 6. The coupling between these two mechanical oscillators is the spring 25. In order to obtain the maximum movement of the vibrating system, it is necessary that the natural frequency of the bell be approximately the same as the natural frequency of the armature and its support, and the degree of coupling between the two should be proper. This coupling may be altered by changing the physical dimensions of the spring 25, for example, if less coupling is desired, the thickness of the metal in spring 25 is decreased and the mass of armature 22 is decreased so that the natural frequency is maintained. The proper coupling is usually determined experimentally.

As the potentials appearing at the electrodes 12 and 13, and hence in the conductors 14 and 14a, are very small compared to the energy in the oscillator and electromagnet circuit, the two circuits should be well shielded one from the other and, if convenient, each pair of wires should be twisted together. The same is true, but to a lesser degree, of the wires in the supporting cable.

The bore hole signals derived from electrodes 12 and 13 are amplified and changed to a variable direct current by the amplifier and detector 2 so that the signal level in the conductors 17 and 18 going to the surface is much greater than the signal level between the electrodes. Any A. C. in the measuring circuit may easily be blocked at the surface.

If the amplifier and the oscillator are not mounted in ferromagnetic cases, a good electromagnetic shield 30 should be provided between the two units.

A modified form of signal emitting device which operates at a self-maintained frequency is disclosed in Figures 2 and 4.

Referring to Figure 2, most of the parts, construction, and function of the devices disclosed therein are identical wtih those described in Figure 1, and corresponding primed numerals have been applied where applicable.

A pickup device 40 similar to an electric phonograph pickup is attached to bell 10' in any suitable fashion. The pickup device 40 may be of any conventional design, and, as shown, it includes a permanent magnet 41, an armature 42 mounted in the magnetic field and a coil 42a around the armature. In a conventional pickup device the permanent magnet is held stationary and the voltages are induced as a result of the motion of the armature. The same may be followed in this case, but it has been found more practical to attach the permanent magnet 41 to the bell and to control the movement of the armature by inertia. This may be done by fixing a short arm 43 and a small weight 44 to the elastic system on which the armature 42 is already mounted as shown in greater detail in Figure 2A. The armature is pivoted as at 45 and the armature is urged to its middle position by a spring 46. The mass of the weight 44 depends upon the stiffness of spring 46. The weight 44 should be great compared to that required to produce a system which is resonant at 600 cycles, but even then mass 44 is small, for example only a fraction of an ounce. While this small system comprising armature 42, which pivots about point 45, the arm 43, the weight 44, and the spring 46 is not rigidly fixed, it has a natural frequency much lower than the vibrating frequency of the bell so that the weight 44 will not follow the motion of the bell. For example, the resonant frequency of the armature 42, arm 43, spring 46 and weight 44 may be 20 or 30 cycles per second as compared to a vibrating frequency of 600 cycles per second.

In this form of the invention, the oscillator 3 in Figure 1 is replaced by a conventional AVC amplifier 47. The electrical circuit is shown in Figure 4.

Referring to Figure 4, the output of the pickup 40 is fed to the input of a wide band amplifier 47, the output of which drives the electromagnet 19'. The remainder of the circuit of Figure 4 is the same as that of Figure 3 and need not be described in detail.

The operation of the modification of Figures 2 and 4 is practically identical to that described in connection with Figures 1 and 3. The apparatus is lowered into the bore hole on the electric cable, and due to spurious vibrations, the armature 22' is set in motion at its resonant frequency. As soon as the armature starts to vibrate, the vertical motion of the bell 10' sets up a corresponding voltage in the pickup unit 40. The voltage derived from pickup 40 is fed into the amplifier 47, the output of which drives the electromagnet 19', as stated before, so that a regenerative system is provided. The natural resonant frequency of the armature 22' and its elastic support 24' remains constant for all practical purposes, but the resonant frequency of the bell changes with the density of the bore hole fluid and other factors, so there are now two coupled mechanical oscillating systems and the frequency of the two systems need not be the same. The above mentioned double-humped frequency characteristics may now appear in the overall system. The mechanical coupling may be altered so that the two oscillating systems are overcoupled; one of the two resonant frequencies is more pronounced than the other. The overall resonant system may, therefore, be maintained on the hump having the largest magnitude; for example, the system may be maintained on the lower resonant frequency.

When the double hump frequency characteristic is present, the phase of one hump is opposite to the phase of the other hump, that is, in terms of phase alone, the two humps are 180° apart. By controlling the phase between the pickup device 40 and the amplifier 47, the resonant system will be maintained on the frequency hump selected. It may be advisable in some cases to include a conventional phase shift network 54 containing resistances and condensers between the pickup 40 and the input of amplifier 47. If the phase is adjusted to maintain the system on one frequency hump, for instance the lower frequency hump, then shifting the phase 180° causes the system to resonate continuously on the higher frequency hump.

Accordingly, the frequency of the bell 10' will change automatically with changes in the fluid density or other factors, and a log of frequency versus depth may be made if desired. Such a log is particularly useful in studying the bore hole fluid, as flows of water, gas, or oil into the bore hole would make various sections of the column of fluid have different densities.

Another arrangement for vibrating the bell vertically is shown in Figures 5, 6, and 7. The apparatus of Figures 5, 6, and 7 may be substituted for the bell 10 and its contents in Figures 1 or 2; that is, the modification shown in Figures 5, 6, and 7 is adaptable to a signal generator of either fixed or variable frequency.

If a constant frequency device is desired, the schematic circuit diagram of Figure 3 will be employed, or if a variable frequency acoustic generator is desired the principles shown in the schematic circuit diagram of Figure 4 will be used.

Figure 5 is a vertical section, and Figure 6 is a perspective view of an acoustic generator wherein a tuning fork is employed to vibrate the bell. The bell 50 contains a tuning fork 51 which is adapted to be continuously energized by an electromagnet 52. The electrical energy for driving the tuning fork is supplied, as described above, to the winding 53 of the electromagnet 52 which drives the tuning fork 51 at its natural frequency. When current is flowing through the winding 53 of the electromagnet, the magnetic flux produced by the core passes out of one of the pole pieces 57 through the air gaps, through the tines 55 and 56 of the tuning fork, to the other pole piece 57, completing the magnetic circuit. Thus, the action of the magnetic field is to pull both tines of the fork toward the electromagnet each cycle or each half cycle as the case may be, so the tuning fork is continuously energized at its natural frequency. The tuning fork and the pole pieces of the electromagnet should be designed so the air gaps are very small yet such that the tuning fork never actually touches either of the pole pieces. Longitudinal grooves formed part way through the tines of the tuning fork reduce the eddy currents.

When the tines of the tuning fork vibrate in opposition, a vertical component of force is present in the stem of the tuning fork, imparting a vertical or axial motion, only, to the bell 50.

Inasmuch as it is necessary to take great precautions to make sure that the entire vibrating system is very rigid so that it may function as one mass, the entire electromagnet may be mounted so that neither the laminated core nor the winding follows the vertical motion of the bell and hence the electromagnet 52 cannot absorb appreciable power.

Referring to Figure 5, the electromagnet 52 is held in place by means of two special mountings, the details of which are better shown in Figure 7. A thin flat sheet 59 of metal, such as steel, is formed having two or more slots 60 and 61 which are substantially the length of the sheet. The sheet 59 is fastened to the bell by means of screws or bolts which pass through holes 62 and 63 in the outer portion of the sheet. The holes 62 and 63 are preferably located on the transverse axis of the sheet as shown in the drawing. The electromagnet 52 is attached to the sheet 59 by a screw which passes through a hole 64 in the center of the sheet. A sheet 59 is provided for both the top and bottom of the electromagnet. Referring to Figure 7, it is evident that the center of each sheet may move very freely in the direction perpendicular to its plane but that the sheet is very rigid in any direction parallel to its plane. Thus the electromagnet 52 is held very rigidly in a horizontal direction so that it may be well centered between the tines of the tuning fork, but it may move freely in a vertical direction. As the electromagnet 52 has considerable mass, and as the bell 50 moves in a vertical direction only, the electromagnet tends to remain stationary and does not follow the vibrations, and hence it does not interfere with the vibration of the bell.

The sheet 59 may be fastened directly to the bell by suitable fasteners passing through holes 62 and 63. However, it is difficult to assemble and adjust the unit so the rod construction shown in Figure 6 is preferred. Any suitable number of stiff rods 65 are rigidly attached to the top portion 50' of the bell 50. The sheets 59, 59 are then fastened to the rods 65, as shown, and the electromagnet mounted on the sheets as described. The tuning fork is also mounted on the removable top end 50' of bell. Thus all the parts are accessible and may be easily adjusted. When completely adjusted, the bottom 50'' of bell 50 is passed over the assembly and parts 50' and 50'' are screwed together. The insulation is then applied over the completed assembly.

The tuning fork and bell assembly shown in Figures 5 and 6 constitute two coupled mechanical oscillating systems and each of these mechanical oscillators may have its own frequency. Therefore, in order to obtain the maximum power output from the vibrating system, it is necessary that the natural frequency of the bell 50 be approximately the same as the natural frequency of the tuning fork, and the degree of coupling between the two should be proper. The coupling may be altered by changing the curvature and the physical dimensions of the throat 66 of the tuning fork.

In order that the system have frequency stability, the parts should be made of materials for which the Young's modulus does not change with temperature. A commercial product known as "Elinvar" has been found very suitable for this purpose.

If the composite oscillating system is always to be operated at a resonant frequency, the pickup device 40 of Figures 2 and 2A is attached to the stem of the tuning fork or to the bell 50 and by using the principles described in connection with the devices disclosed in Figures 2 and 4, the frequency may vary as ambient conditions change.

Other arrangements for vibrating the bell vertically are illustrated in Figures 8 and 9. These modifications have the advantage that the constants are essentially lumped and consequently the design and computations are much simpler than for a tuning fork, for the mass of the tines of the tuning fork is distributed throughout their length and their center of gravity is not well defined. Also the axis of rotation of the moving masses is well defined in the modifications of Figures 9 and 10 so that it is easy to compute the natural frequency of such a system. The frequency may be easily changed as desired. Also in the arrangements shown, the mechanical coupling between the two mechanical oscillating systems may be easily adjusted in either direction.

Referring to Figure 8, the bell 80 may be the same as was discussed in connection with Figures 1 and 5, and the apparatus above the bell is identical to that previously explained, that is, the bell is supported from an elastic rod which is in turn fastened to a relatively large mass containing an oscillator, amplifier, and so forth. The feature of the modification illustrated in Figure 8 is the means for vibrating the bell.

Two laminated masses 81 and 82 are connected together by means of a U-shaped spring 83.

Each of the two masses 81 and 82 is supported from and fastened to the base of bell 80 by means of the U-shaped spring members 84 and 85 respectively which function essentially as hinges. The recesses 86 formed in the members 81 and 82 provide space for a coil winding 87 which is disposed on an insulating spool 88. The spool 88 and its winding 87 are supported by four or more arms 89 which are fastened to the side walls of the bell 80.

In operation the winding 87 is energized from a suitable source such as an oscillator or amplifier 3. When the winding 87 is energized, the resultant magnetic field urges the two masses 81 and 82 toward one another. This motion is resisted by spring 83 so that when the winding 87 is deenergized, the spring 83 urges these two masses 81 and 82 away from one another. When the two masses 81 and 82 move toward or away from one another, their paths essentially follow arcs the centers of which are the axes of rotation 90 and 91 respectively in much the same fashion as the apparent mass of one time of the tuning fork moves about a point in the yoke of the fork. The motion of the two masses 81 and 82 about their axes of rotation 90 and 91, respectively, is resolved into horizontal and vertical components, with the result that the two horizontal components are always equal and opposite and cancel while the two vertical components are always in phase and additive to provide axial vibration of the bell 80. While the resultant vibrations in a vertical direction are the same as those of Figure 5, the critical adjustments may be much more easily varied in the modification of Figure 8. For example, if a higher resonant frequency is desired, the two legs of the spring 83 may be made thicker or they may be shorter; thus the resonant frequency may be conveniently altered without changing any of the other characteristics of the acoustic generator. The coupling between the two mechanical oscillating systems, that is, the coupling between masses 81 and 82 and the bell 80, may be conveniently altered by moving the pivot members 84 and 85 closer together or farther apart as desired. The coupling may thus be adjusted in either direction as often as convenient.

In order to construct a coil which does not affect the vibrating masses, the spool 88 and the winding 87 are suspended from the resilient members 89 so that the natural frequency of the coil and members 89 is very low. In this way the coil 87 does not follow the vertical motion of the bell. The members 89 are similar in construction and function to the sheets 59 in Figures 5 and 6.

Another construction which operates upon the same principle as Figure 8 is shown in Figure 9. The L-shaped laminated masses 95 and 96 constitute the vibrating members. Vibrating members 95 and 96 are suspended on members 97 and 98 which function as pivots. The elastic member 99 between the two vibrating members 95 and 96 takes the form of a tore or a flat ring to which each of the vibrating members 95 or 96 is rigidly attached.

A coil winding 100 is formed on a magnetic core 101 having pole pieces 102 and 103. Two high permeability paths for the magnetic flux are, therefore, created by core 101, pole piece 102, air gaps 104 and 104', members 95 and 96, the air gaps 105 and 105', and pole piece 103. The entire assembly including parts 100, 101, 102, and 103 is supported at each end by resilient plates 106 which are similar to the sheets 59 shown in Figure 7; thus the assembly may move freely in a vertical direction but is rigidly restrained in all lateral directions, maintaining the air gap uniform. The operation is practically identical to that previously described in connection with Figure 8. The winding 100 is energized from a suitable source such as an amplifier or oscillator which creates a magnetic flux the strength of which varies at the same frequency, or at double the oscillator frequency, as desired. The vibrating members 95 and 96 are, therefore, pulled toward one another when the coil 100 is energized. When the coil 100 is deenergized, the members 95 and 96 are urged apart by the action of the circular spring 99. As the two masses 95 and 96 described arcs about their centers of rotation 107 and 108, respectively, the circular spring 99 is alternately compressed and expanded so that it becomes an ellipse, the long axis of which coincides with the plane of members 95 and 96, then a circle in its neutral position, then an ellipse with its short axis coinciding with the planes of vibrating members 95 and 96.

The construction illustrated in Figure 9 offers the same advantages as the construction of Figure 8 and for the same reasons. The coupling may be altered by moving the members 97 and 98 toward or away from one another. The natural frequency of the oscillating system may be altered by modifying the spring 99.

As the armature assembly is supported very weakly in a vertical direction, it does not follow the vertical motion of the bell, and its mass need not be considered when determining the characteristics of a mechanical oscillating system.

From the foregoing it will be clear that novel signal generators have been provided which operate with equal efficiency in media under any pressure conditions and that such generators may be made small enough to be lowered into bore holes of great depth and at the same time are capable of emitting pressure pulses of sufficient magnitude for the purpose desired.

While several specific embodiments of the invention have been described in detail above, it will be understood that these embodiments are susceptible to considerable modification and that, therefore, they should be considered as illustrative of the invention and not as limiting the scope of the following claims.

I claim:

1. An apparatus for emitting pressure pulses in a liquid comprising a first liquid-tight casing, a liquid-tight substantially rigid bell casing, means having capacity for elongation and contraction connecting said bell casing to said first casing, an electromagnet in said bell casing, means in said first casing for supplying alternating current to said electromagnet, and armature means resiliently connected to said casing and adjacent to said electromagnet, whereby, upon energization of said electromagnet, said bell casing is reciprocated bodily with respect to said first casing.

2. An apparatus for emitting pressure pulses in a liquid comprising a first liquid-tight casing, a substantially rigid, liquid-tight bell casing, means having capacity for elongation and contraction connecting said bell casing to said first casing, an electromagnet in said bell casing having a core, means including an oscillator in said first casing for supplying alternating current to said electromagnet, armature means disposed relatively close to said core, and a resilient member connected to said casing and to said armature means, whereby upon energization of said electromagnet, said bell casing is reciprocated bodily with respect to said first casing.

3. An apparatus for emitting pressure pulses in a liquid comprising a first liquid-tight casing, a substantially rigid liquid-tight bell casing, means having capacity for elongation and contraction connecting said bell casing to said first casing, an electromagnet in said bell casing, means in said first casing for supplying alternating current to said electromagnet, a tuning fork having vibratable arms and a base, means connecting said base to one end of said bell casing with said arms on opposite sides of said electromagnet, whereby, upon energization of said electromagnet, said bell casing is reciprocated bodily with respect to said first casing.

4. An apparatus for emitting pressure pulses in a liquid, comprising a first liquid-tight casing, a substantially rigid liquid-tight bell casing, means having capacity for elongation and contraction connecting said bell casing to said first casing, an electromagnet in said bell casing, means in said first casing for supplying alternating current to said electromagnet, a pair of spaced apart armature arms on opposite sides of said electromagnet resiliently connected at one end to the end of said bell casing, whereby, upon energization of said electromagnet, said bell casing is reciprocated bodily with respect to said first casing.

5. An apparatus for emitting pressure pulses in a liquid comprising a first liquid-tight casing, a substantially rigid liquid-tight bell casing, means having capacity for elongation and contraction connecting said bell casing to said first casing, an electromagnet in said bell casing, means for resiliently supporting said electromagnet in said bell casing to permit movement of said bell casing relatively to said electromagnet, means in said first casing for supplying alternating current to said electromagnet, and armature means resiliently connected to said casing and disposed adjacent to said electromagnet, whereby, upon energization of said electromagnet, said bell casing is reciprocated bodily with respect to said first casing.

6. An apparatus for emitting pressure pulses in a liquid comprising a support, a substantially rigid bell resiliently connected to said support, vibrator means in said bell for reciprocating said bell bodily with respect to said support in said liquid, and means responsive to vibration of said bell for maintaining the frequency of said bell at substantially its natural resonant frequency.

7. An apparatus for emitting pressure pulses in a liquid comprising a substantially rigid bell, electro-mechanical vibrator means in said bell for reciprocating said bell bodily in said liquid, a pickup means in said bell for supplying alternating current in response to vibration of said bell, and an amplifier for supplying electrical energy to said vibrator, said pickup means being electrically connected to said amplifier to cause said bell to reciprocate at its resonant frequency.

8. An apparatus for emitting pressure pulses in a liquid comprising a first liquid-tight casing, a substantially rigid liquid-tight bell casing, means resiliently connecting said casings for relative axial movement, an armature resiliently connected to said bell casing for vibration to provide an energy component axially of said bell, an electromagnet having a coil winding in said bell casing adjacent to said armature, an amplifier in said first casing adapted to be energized from an external source and connected to said electromagnet for energizing the same, and means supporting said coil winding resiliently in said bell casing.

9. An apparatus for emitting pressure pulses in a liquid comprising a first liquid-tight casing, a substantially rigid liquid-tight bell, means resiliently connecting said casing and said bell for relative axial movement, a pair of armatures secured to one end of and within said bell having end portions in spaced apart relationship, an electromagnet disposed between said portions and supported resiliently for movement axially of said bell, and an amplifier in said casing adapted to be energized from an external source for energizing said electromagnet to cause said bell to be reciprocated bodily with respect to the casing.

10. An apparatus for emitting pressure pulses in a liquid comprising a first liquid-tight casing, a substantially rigid liquid-tight bell, means resiliently connecting said casing and said bell for relative axial movement, a pair of armatures secured to one end of and within said bell having end portions in spaced apart relationship, resilient means interposed between said armatures normally urging them apart, an electromagnet disposed between said end portions and supported resiliently for movement axially of said bell, and an amplifier in said casing adapted to be energized from an external source for energizing said electromagnet.

11. An apparatus for emitting signals in a liquid comprising a first liquid-tight casing, a liquid-tight, substantially rigid, hollow, bell casing, means having a capacity for elongation and contraction connecting said bell casing to said first casing, and vibrator means in said bell casing for reciprocating said bell casing bodily in said liquid with respect to said first casing.

12. An apparatus for emitting pressure pulses in a liquid comprising a first liquid-tight casing, a liquid-tight, substantially rigid, hollow, bell casing, means having a capacity for elongation and contraction connecting said bell casing to said first casing, and vibrator means in said bell casing including an electromagnet, and means for energizing said electromagnet to reciprocate said bell casing bodily with respect to said first casing.

ANDRÉ BLANCHARD.

REFERENCES CITED

The following references are of record in the file of this patent:

UNITED STATES PATENTS

| Number | Name | Date |
|---|---|---|
| 636,519 | Gray et al. | Nov. 7, 1899 |
| 935,750 | Gale | Oct. 5, 1909 |
| 942,897 | Garrett et al. | Dec. 14, 1909 |
| 1,097,859 | Hecht | May 26, 1914 |
| 1,518,123 | Lawther | Dec. 2, 1924 |
| 1,526,414 | Bois-Reymond | Feb. 17, 1925 |
| 1,577,741 | Bois-Reymond et al. | Mar. 23, 1926 |
| 1,604,693 | Hecht et al. | Oct. 26, 1926 |
| 1,872,946 | Hecht | Aug. 23, 1932 |
| 2,405,225 | Mason | Aug. 6, 1946 |

FOREIGN PATENTS

| Number | Country | Date |
|---|---|---|
| 311,327 | Great Britain | June 5, 1930 |
| 704,486 | France | May 20, 1931 |